United States Patent [19] [11] 4,375,851
Paulos [45] Mar. 8, 1983

[54] SKIN PACKAGING
[75] Inventor: James P. Paulos, Brooklyn Center, Minn.
[73] Assignee: Bemis Company, Inc., Minneapolis, Minn.
[21] Appl. No.: 198,204
[22] Filed: Oct. 17, 1980

Related U.S. Application Data
[62] Division of Ser. No. 15,412, Feb. 26, 1979, abandoned.
[51] Int. Cl.³ .............. B65D 73/00; B65D 75/36; B65D 75/54; B65D 83/08
[52] U.S. Cl. .................... 206/471; 229/55
[58] Field of Search ............... 206/471, 83.5; 229/55

[56] References Cited
U.S. PATENT DOCUMENTS 2,861,405 12/1958 Hanford ..................... 206/471
2,876,899 3/1959 Maynard, Jr. ............... 206/471
3,253,705 5/1966 Stoker, Jr. ................... 206/471
3,474,952 10/1969 Cover, Jr. et al. ............ 229/53
3,595,722 7/1971 Dawbarn ..................... 229/55
3,895,983 7/1975 Lang et al. .................. 156/79
4,101,358 7/1978 Kim et al. ................... 156/167

Primary Examiner—William T. Dixson, Jr.
Attorney, Agent, or Firm—Senniger, Powers, Leavitt and Roedel

[57] ABSTRACT

Skin packaging material comprising a film of thermoplastic material having a reinforcement consisting of strands (in the form of netting, or all extending in one direction parallel to one another) adapted on exposure for an appropriate time interval to a source of heat to have both the film and strands heat up to a forming temperature for being skin packaged around an article on a substrate, with the strands less extensible than the film on equal heating of the film and strands, and the skin packaging of articles utilizing said material in such manner that the strands flare out from the article at the base of the article to provide a broader base of support for the article and to prevent undue thinning of the film.

10 Claims, 13 Drawing Figures

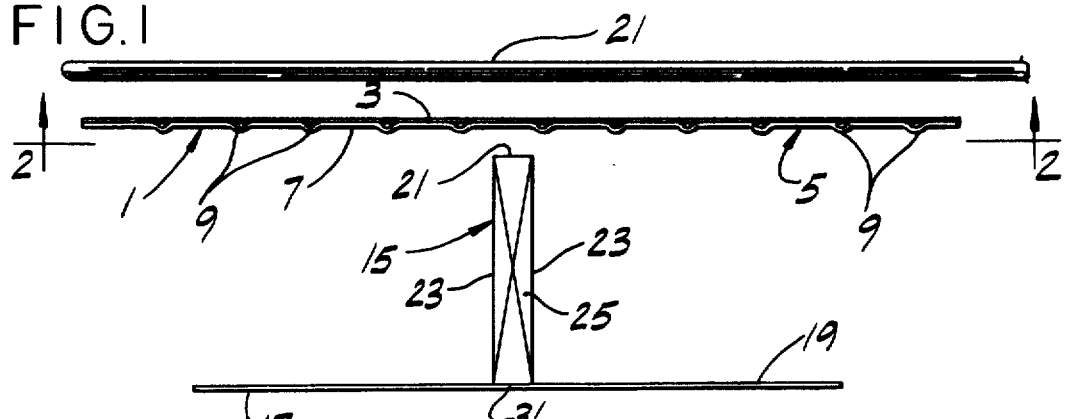
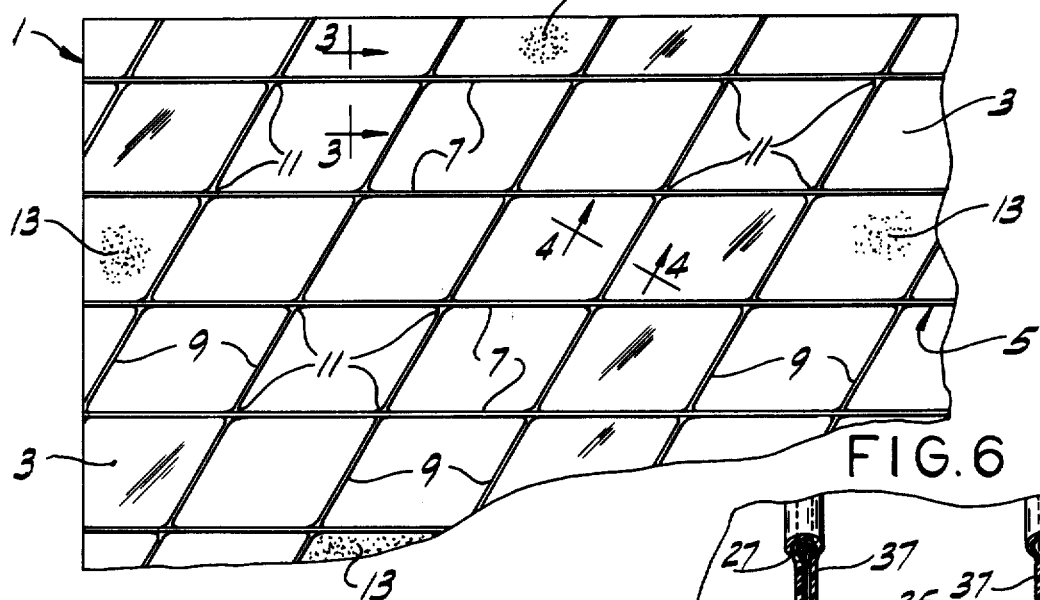
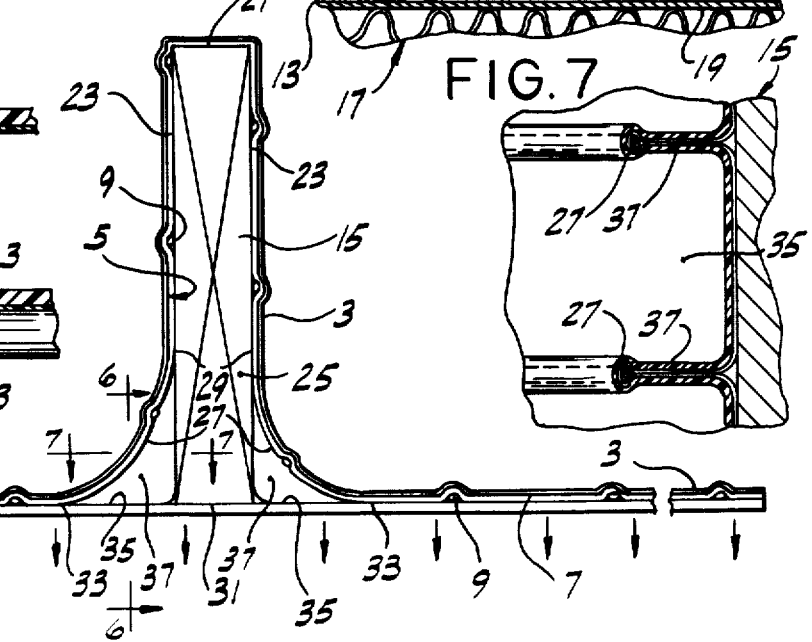

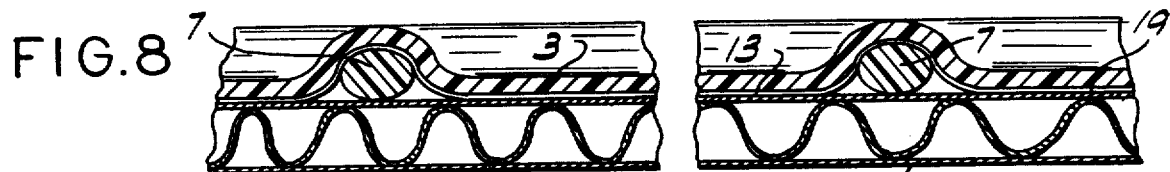
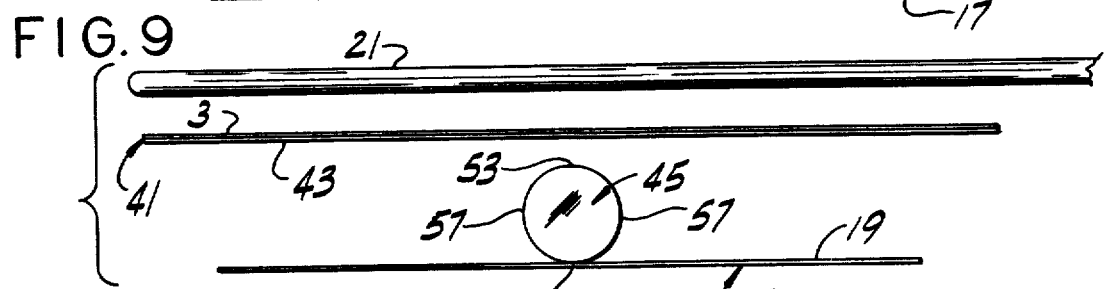
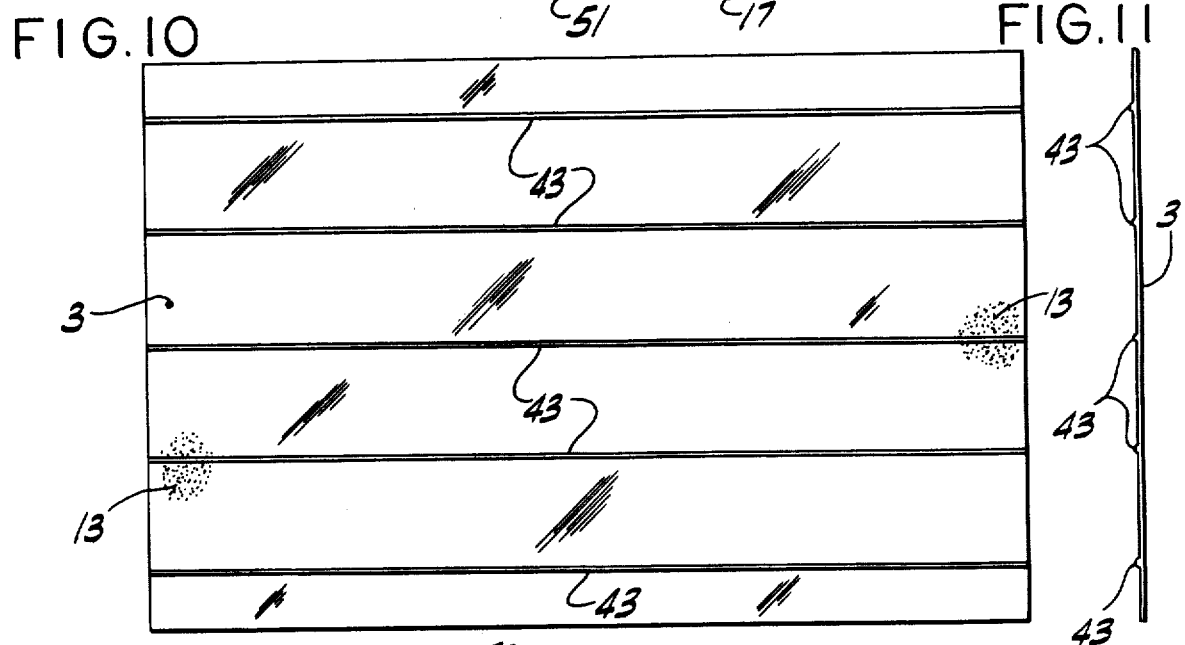
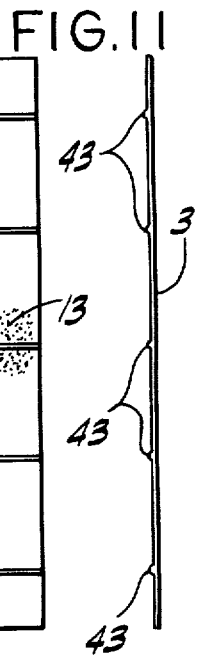
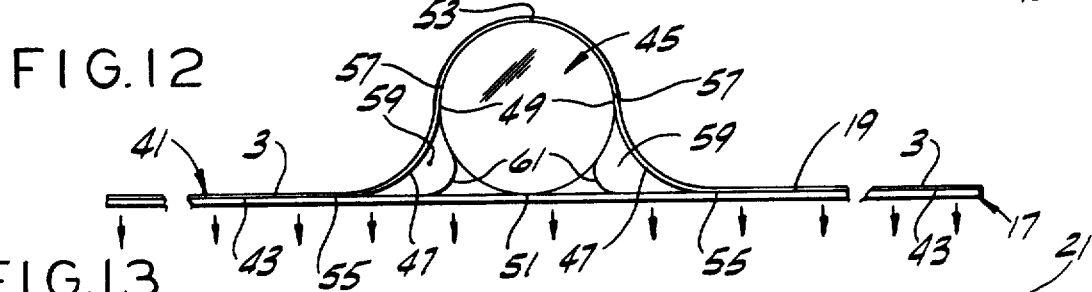
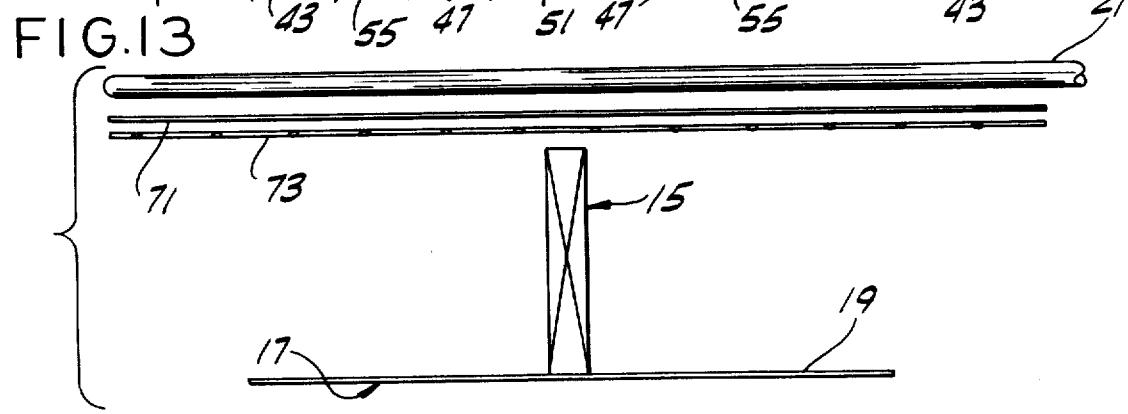

SKIN PACKAGING

This is a division of application Ser. No. 15,412, filed Feb. 26, 1979, now abandoned.

BACKGROUND OF THE INVENTION

This invention relates to skin packaging, and more particularly to skin packages and methods of making the packages.

As is well known in the art of packaging, a skin package is one made by placing an article on a substrate (e.g., a piece of paperboard) which is adapted to have air drawn therethrough for the skin packaging operation, heating a thermoplastic wrapper to a temperature such as to place it in condition for being drawn over the article and vacuum-drawn into contact with the article, and for being thermally bonded (i.e., heat-sealed or fused) to the substrate, draping the heated wrapper over the article, and drawing it against the substrate and around the article by drawing a vacuum through the substrate. The wrapper becomes like a skin on the article and substrate. Reference may be made, for example, to U.S. Pat. No. 3,031,072 showing such a package and method, and referring to use of polyolefin film (and particularly polyethylene film) for the wrapper.

The above-described skin packaging technique has been highly successful and extensively used for packaging relatively small and light-weight articles. It has heretofore been relatively uneconomical and impractical, however, to apply the technique to the skin packaging of high-profile articles which require a relatively deep draw and which are relatively heavy, requiring extra-firm confinement of the article on the substrate to prevent it from tipping over. Here it may be observed that if film which is relatively thin to begin with is used (for economy not only as to amount of film used but also to avoid prolonged heating time for the film), the film may be thinned to such an extent on account of the deep draw that the package may be weak and the article (depending on its shape) may be easily tipped over on the substrate. On the other hand, if thick film is used to avoid the problems arising from the use of thin film, the amount (poundage) of film required and/or the time required to heat the film to the softening point for the drawing operation may exceed economical limits. It has also been impractical in certain instances to apply the technique to the skin packaging of articles which are of such shape as, in effect, to have an undercut or undercuts in their position as placed on the substrate, the impracticality being due to the film being drawn into the undercut or undercuts, and being thinned down to such an extent as unduly to weaken the package. An example of an article which presents such undercuts is a cylindrical article laid on its side (rather than on one end) on the substrate.

SUMMARY OF THE INVENTION

Accordingly, among the several objects of the invention may be noted the provision of an improved skin package construction and method of skin packaging enabling economical and effective skin packaging of high-profile articles which, on account of their shape, require a relatively deep draw of the wrapper; the provision of such a package construction and method enabling economical and effective skin packaging of articles which, on account of their weight, require a relatively strong skin; the provision of such a material, package construction and method enabling extrafirm confinement on the substrate of an article, especially a high-profile article which requires a relatively deep draw and which is relatively heavy; the provision of such a package construction and method enabling economical and effective skin packaging of articles which are of such shape as to have an undercut of undercuts in their position as placed on the substrate; the provision of such a package construction and method which, in addition to the above, are such that propagation of tearing of the skin of the package during shipping, storage or display is reduced, and the adhesion of the skin to the article is reduced, reducing the possibility of damaging or marring the article, as might otherwise result from widespread adhesion of the skin to the article, also making it easier to peel off the skin; and the provision of such a package construction and method which may impart decorative or cosmetic appeal to the package.

In general, skin packaging material used in this invention comprises a film of thermoplastic material adapted on exposure for an appropriate time interval to a source of heat to heat up to a forming temperature at which it is softened and inelastically extensible for being skin-packaged around an article on a substrate, and a reinforcement for the film comprising strands also of thermoplastic material adapted on exposure together with the film to the source of heat for said time interval to heat up to a forming temperature at which the strands are softened and inelastically extensible for being skin-packaged together with the film around the article.

The method of the invention involves placing an article on a substrate which is adapted to have air drawn therethrough, the article being placed on a face of the substrate which is adapted for heat-sealing thereto of a wrapper of thermoplastic material, heating a wrapper for skin-packaging the article on the substrate, the wrapper comprising a film of thermoplastic material adapted on exposure for an appropriate time interval to a source of heat to heat up to a forming temperature at which it is softened and inelastically extensible for being skin-packaged around an article on a substrate, and a reinforcement for the film comprising strands also of thermoplastic material adapted on exposure together with the film to the source of heat for said time interval to heat up to a forming temperature at which the strands are softened and inelastically extensible for being skin-packaged together with the film around the article, the strands being so related to the film, as determined by their composition, thickness and color, that when heated simultaneously with the film for the said time interval they become extensible but less extensible than the film, the wrapper, comprising the film and strands, being heated by exposure to a source of heat for said time interval concurrently to heat both the film and the strands up to forming temperature, draping the heated wrapper over the article on the substrate, and drawing a vacuum through the substrate to draw the wrapper, comprising the film and strands, around the article and into contact with said face of the substrate; and to effect heat sealing of the film to said face of the substrate, strands overlying the article resisting being drawn toward the base of the article and portions of these strands solidifying into members flowing outwardly and downwardly from points on the article between the base and the top of the article to points on the substrate spaced outwardly from the base of the article.

A package made in accordance with the invention comprises a substrate of a material adapted to have air drawn therethrough and adapted for thermal bonding to one face thereof of thermoplastic material, an article on said face of the substrate, and a wrapper overlying the article and bonded to said face of the substrate, said wrapper comprising a film of thermoplastic material and a reinforcement for the film, said reinforcement comprising a plurality of strands of thermoplastic material, said strands being so related to the film, as determined by their composition, thickness and color, that when heated simultaneously with the film they become extensible along with the film but less extensible than the film, said film and said reinforcement being drawn over the article and providing a reinforced skin at least substantially covering the article and holding it on the substrate, strands overlying the article having, by reason of their lower extensibility than the film on being heated simultaneously with the film, portions flaring outwardly and downwardly from points on the article between the base and the top of the article to points on the substrate spaced outwardly from the base of the article.

Other objects and features will be in part apparent and in part pointed out hereinafter.

BRIEF DESCRIPTION OF THE DRAWINGS

FIG. 1 is a view showing a wrapper of skin packaging material used in this invention being heated for being skin-packaged around an article on a substrate;

FIG. 2 is a bottom plan of the material shown in FIG. 1;

FIGS. 3 and 4 are enlarged sections on lines 3—3 and 4—4, respectively, of FIG. 2;

FIG. 5 is a view showing the wrapper of FIG. 1 skin-packaged around the article on the substrate of FIG. 1;

FIGS. 6 and 7 are enlarged sections on lines 6—6 and 7—7, respectively, of FIG. 5;

FIG. 8 is an enlarged section of the substrate and wrapper thereon;

FIG. 9 is a view showing a wrapper of another skin packaging material used in this invention being heated for being skin-packaged around another article on a substrate;

FIG. 10 is a bottom plan of the material shown in FIG. 9;

FIG. 11 is a right end view of FIG. 10;

FIG. 12 is a view showing the wrapper of FIG. 9 skin-packaged around the article on the substrate of FIG. 9; and FIG. 13 is a view showing another mode of skin packaging of this invention using initially separate film and reinforcement for the wrapper.

Corresponding reference characters indicate corresponding parts throughout the several views of the drawings.

DESCRIPTION OF THE PREFERRED EMBODIMENTS

Referring to the drawings, first more particularly to FIGS. 1–6, reference numeral 1 identifies a wrapper of skin packaging material used in this invention, shown to be a composite material comprising a film 3 and a reinforcement 5 for the film. The film 3 is of a thermoplastic material, such as ethylene vinyl acetate, adapted on exposure to a source of heat for an appropriate time interval to heat up to what may be referred to as a forming temperature, at which it is softened and inelastically extensible (in what may be referred to as a viscous state) for being skin-packaged around an article on a substrate. Being "skin-packaged" generally means being packaged by operations involving the heating of the wrapper to the forming termperature, draping it over an article on a substrate through which a vacuum may be drawn, and drawing the wrapper around the article and against the substrate by drawing a vacuum through the substrate. The reinforcement comprises an array of strands also of a thermoplastic material, which may or may not be the same as the material of the film, adapted on exposure together with the film to the source of heat for said time interval to heat up to a forming temperature at which the strands are softened and inelastically extensible for being skin-packaged together with the film around the article. The term "strands" is used in the sense of relatively long slender elements.

In the presently preferred mode, the strands in the wrapper material are in the form of netting, comprising a first set of strands 7 extending generally parallel to one another in one direction, and a second set of strands 9 extending generally parallel to one another in another direction, the strands 7 intersecting the strands 9 and being integrally joined at the intersections as indicated at 11. The netting is initially formed separately from the film, as by extrusion in the manner described in such U.S. Pat. as Nos. 2,919,467 and 3,957,565, and suitably bonded to the film. For example, it may be laminated to the film by applying by extrusion a coating 13 on one face of the film 3 of a relatively thin layer of thermoplastic material, such as coating grade polyethylene, adapted on heating of the film to forming temperature to become softened and inelastically extensible along with the film and heat-sealable to a substrate in a skin packaging operation, and combining the pre-formed netting with the coated film on the coated face of the film, the netting thereby becoming bonded to the film by the coating. The latter is exposed in the interstices of the netting, i.e., in the areas bounded by the strands.

With regard to the reference to the film as being adapted on exposure to a source of heat for an appropriate time interval to heat up to a forming temperature, at which the film is softened and inelastically extensible (i.e., in a viscous state) for being skin-packaged around an article on a substrate, it will be understood that thermoplastic films such as used for skin packaging, e.g., ethylene vinyl acetate film, are films which when heated up to a certain temperature start to become soft or viscous, and on further heating become increasingly soft or viscous. Within a certain temperature range they are sufficiently soft and inelastically extensible (viscous) for a skin packaging operation, without being burned or so weakened as to tend to rupture in a skin packaging operation. The same considerations apply to the strands.

The strands of the composite material may be such that they become generally equally extensible with the film (i.e., their viscosity is generally the same as that of the film) when the material is heated for the appropriate time interval for a skin packaging operation. It is preferred, however, that the strands be such that when they are heated along with the film for the time interval required to bring the film up to a forming temperature (in the temperature range for skin-packaging), they are less extensible than the film, with the result that, in effect, more force is required to draw the strands a given amount than is required to draw the film that amount. This provides for flaring of the strands in the skin packaging operation outwardly and downwardly from the article being packaged at the base of the article to produce what may be termed a "tenting" or "webbing" effect of the strands at the base of the article (see FIG. 5) for a broader base of support and firm confinement of the article on the substrate and other advantages, as will appear. Thus, for example, the material 1 may comprise ethylene vinyl acetate film which is adapted for forming in a skin packaging operation at a temperature generally in the range from 100° C. to 140° C. and strands of a blend comprising by weight 60% ethylene vinyl acetate and 40% polypropylene adapted for forming at a temperature generally in the range from 120° C. to 160° C., the composite material being heated for a time interval sufficient to bring both the film and the strands up to a forming temperature of 130° C., for example. This is toward the high limit of the forming temperature range for the film and toward the low limit of the forming temperature range for the strands, with the result that the strands are less extensible (more viscous) than the film.

While in the preferred mode the film and strands are so selected that, on concurrent exposure of the film and strands to the same source of heat for the time interval required to bring the film up to forming temperature, and also to bring the strands up to forming temperature but with less extensibility for the strands than the film, the heating time is kept above that at which excessive tenting or webbing of the strands would occur. What degree of tenting or webbing may be excessive varies widely according to the size and shape of the articles being skin-packaged and whether only one or a plurality of articles are being skin-packaged on a substrate. For example, tenting or webbing extending much beyond 2½ inches from the base of an article presents problems when a plurality of articles are being packaged. On the other hand, tenting or webbing of less than ½ inch offers little improvement in package strength and support.

Generally, in carrying out the invention, a selection is made of the film which is to be used. The film will require heating for a certain length of time when exposed to a source of heat (e.g., the heating means in a typical skin packaging machine) to bring it up to the desired forming temperature. Then a selection is made of a reinforcement (strands) so related to the film that when the strands are heated with the film for the stated heating time for the film, the strands become formable, but to a lesser degree than the film. The degree of extensibility of the strands reached in the stated heating time depends on the thickness, softening point and infrared absorptivity of the strands (the higher the thickness and softening point and the lower the infrared absorptivity of the strands, the lower the extensibility and vice versa). Thus, in selecting the strands, consideration is given to their thickness, composition (which determines their softening point), and color or absence of color (which determines their infrared absorptivity). "Softening point" relates to a temperature in the range of temperatures in which the composition is formable. For example, if it is decided to use for the strands a composition with a certain softening point and to form the strands of a certain thickness, and these are so related to the film that if the composition is clear (transparent) the strands will not reach the softening point in the heating time for the film, the strands may be made colored for faster heating.

The method of skin packaging an article on a substrate in accordance with this invention is illustrated in FIGS. 1, 2 and 5 wherein the reference numeral 15 designates the article and 17 designates the substrate. The article 15 has the shape of a rectangular parallelopiped, for example. The substrate 17 is a rectangular piece of corrugated paperboard, for example, which is sufficiently porous for drawing a vacuum therethrough. It may or may not have a coating on its face 19 on which the article is to be packaged (its upper face as shown) of a thermoplastic material such as an ionomer resin such as that sold under the trade name SURLYN by E. I. duPont De Nemours Co., of Wilmington, Del. A wrapper 1, comprising the film and netting, is clamped in the wrapper clamping frame of a skin-packaging machine, which may be any one of various commercially available skin-packaging machines, such as a Model 400 SVA AMPAK machine sold by American Packaging Corp. of Hudson, Ohio, and subjected to heat from the heating means 21 of the machine for the appropriate time interval for heating the film and the strands of the netting up to forming temperature. The heating means of the machine comprises a set of quartz infrared heaters, for example, and heats the wrapper by radiation. The substrate 17 is placed on the bed of the machine. When the wrapper 1 has been heated up to the forming temperature, the frame in which the wrapper is clamped is brought down over the article and thereby drape the wrapper over the article and down upon the upper face 19 of the substrate. Then, a vacuum is drawn through the substrate 17 as indicated by the arrows in FIG. 5 to draw the wrapper 1, comprising the film 3 and the netting 5, down around the article and against the upper face 19 of the substrate, with thermal bonding at least of the film 3 to the upper face 19 of the substrate. Generally, the wrapper is positioned with its netting side down (facing the substrate). The film becomes bonded to the substrate in the areas bounded by the strands of the netting, i.e., in the interstices of the netting. The strands may also become bonded to the substrate.

If the film and netting wire equally extensible, the wrapper 1 would be drawn into skin-tight engagement with the article generally over the entire exposed surface of the article, i.e., into engagement generally with the entire areas of the top 21, sides 23 and ends 25 of the article. In some instances there may be what might be considered some slight tenting or webbing of the strands at the base of the article, but its effect is negligible. However, with the strands of the netting being less extensible than the film (despite having been subjected to heat for the same time interval as the film), the strands resist being drawn in entirely against the sides 23 and ends 25 of the article, and curved portions of the strands such as indicated at 27 in FIG. 5 solidify in the form of curved ribs or fillets flaring outwardly and downwardly from points on the article such as indicated at 29 in FIG. 5 between the bottom or base 31 of the article and the top 21 of the article to points such as indicated at 33 in FIG. 5 spaced outwardly from the base 31 of the article. While this solidification of the strands occurs before they are drawn in completely toward the lower portion of the article, the drawing of the film persists for a brief interval after the strands have solidified and the ribs or fillets 27 have been formed, and the film is drawn in between the ribs or fillets toward the lower portion of the article and the substrate. Portions 35 of the film drawn in between the ribs or fillets toward the lower portion of the article 15 come into contact with the substrate 17 and are sealed to the substrate (see FIGS. 5–7), and portions of the film beneath the ribs or fillets and extending down from the ribs or fillets to the substrate become sealed together face-to-face forming double-layer webs or gussets of the film as indicated at 37 in FIGS. 5–7. These gussets 37 serve to strengthen and rigidify the ribs or fillets, and the portions 35 provide for adhesion and confinement of the article 15 generally up to the base 31 of the article.

Thus, there is produced a skin package of this invention comprising the substrate 17, the article 15 on the face of the substrate, and the wrapper 1 comprising the film 3 of thermoplastic and the reinforcement 5 comprising the netting consisting of strands 7 and 9, the film and strands being drawn over the article and providing a reinforced skin covering the article and holding it on the substrate. The film is bonded by the coating 13 (which secures the netting to the film) to the face 19 of the substrate through the interstices of the netting. Each of the strands 7, 9 of the netting overlying the article has the rib or fillet portion 27 flaring outwardly and downwardly from points 29 on the article between the base 31 and the top 21 of the article to points 33 on the substrate 17 spaced substantially outwardly from the base 31 of the article. These ribs or fillets provide a substantial tenting or webbing effect, affording what is in effect a broader base of support for the article preventing it from tipping over, while providing for an increased perimeter of contact and adhesion between the wrapper and the substrate which serves to distribute the load of the article over a greater area of substrate. With this arrangement, relatively high profile articles (requiring a relatively deep draw) may be effectively skin-packaged and firmly confined on the substrate to prevent them from being tipped over. The provision of the netting on the film enables use of a thinner film than would otherwise be necessary on account of the relatively deep draw, and the combination of thinner film and netting for skin packaging a particular article yields a greater area of packaging material per pound of material than the thicker film per se which heretofore would have been required for skin packaging those articles. Not only does economy result from this saving in poundage of material; there is a further saving due to reduction in heating cycle time. Thus, the relatively thin film plus netting of this invention requires less heating cycle time than the thicker film per se heretofore needed for comparable results, and less heating cycle time means increased output of packages. With the netting reinforcement on the film, the amount of thinning of the film in the skin packaging operation is reduced, thereby reducing the tendency for blow-out of the film a the vacuum is applied. This is especially significant in the case of packaging articles which have undercuts, channels or cavities, into which the film would otherwise be drawn and critically thinned down. With the netting, the film is prevented from being drawn into such undercuts, channels or cavities, and thus prevented from excessive thinning and possible blow-out. Also, the reinforced film of this invention tends to remain thicker in critical areas of a packaged article, such as the top edges of the article where puncture otherwise often occurs, and around the base of the article where both strength and adhesion are needed. Further, the reinforced film of this invention has improved tear resistance, the netting providing a rip-stop feature for the film, preventing tear propagation during shipping, storage and display. The provision of the netting with the netting against the article imparts the further advantage of reducing the adhesion of the wrapper to the article (by reducing the surface area of the film in intimate contact with the article reducing damage to or marring of the article surface (important, for example, as to an article with a chrome surface) as well as facilitating the removal of the wrapper. By the use of various patterns, textures and colors for the netting, visible through a clear film, for example, the package may be given decorative or cosmetic appeal.

The lamination of the pre-formed netting 5 to the film 3 by the coating 13 of thermoplastic material (e.g., polyethylene) on the film not only provides for the securement of the netting to the face of the film, but also provides a medium for the bonding of the film to the substrate 17 in the interstices of the netting, and thus may enable the use of uncoated substrates and eliminate the need for use of more expensive coated substrates such as heretofore have been required in many instances.

As above described, the netting 5 is pre-formed and bonded to the film 3. As an alternative, the film and the strands may be simultaneously extruded to form composite film and netting in which the netting is integral with the film. Reference may be made to U.S. Pat. Nos. 3,193,604 and 3,394,433, for example, for coextrusion of film and netting.

Alternatively, as shown in FIGS. 9–12 the wrapper, here designated 41, may comprise a film 3 and a reinforcement consisting of a single set of strands 43 similar to strands 7, all extending in one direction generally parallel to one another on one face of the film. In this alternative, the strands may initially be formed separate from the film and bonded to the film by a coating of thermoplastic material 13, the same as for the netting, or the strands may be co-extruded with the film in well-known manner. In the latter case, the strands are in the form of integral ribs on one face of the film.

FIGS. 9 and 12 show the packaging of a cylindrical article 45 on a substrate 17 in accordance with this invention. As shown, the cylindrical article is laid on its side on the substrate. The wrapper 41, arranged with its strands or ribs 43 down and extending transversely with respect to the cylindrical article, is clamped in the frame of the skin-packaging machine and subjected to heat from the heating means 21 of the machine for the appropriate time interval for heating the film and the strands or ribs 43 up to forming temperature. With the heating means out of the way, the substrate is moved up to drape the wrapper over the article with the strands or ribs 43 extending transversely over the article. Then, a vacuum is drawn through the substrate as indicated by the arrows in FIG. 12 to draw the wrapper 41, comprising the film 3 and the strands or ribs 43, down around the article 45 and against the upper face 19 of the substrate. The film becomes bonded to the substrate in the areas between the strands or ribs, and the latter may also become bonded to the substrate. With the strands or ribs 43 less extensible than the film, they resist being drawn in at opposite sides of the lower part of the cylindrical article (where it is in effect undercut), and curved portions of the strands or ribs 43 such as indicated at 47 solidify in the form of curved fillets (similar to fillets 27) flaring outwardly and downwardly from points on the article such as indicated at 49 between the base 51 of the article (as laid on the substrate 17) and the top 53 of the article to points on the substrate such as indicated at 55 spaced outwardly from the vertical planes of the sides 57 of the article. The film is drawn in between the fillets 47 and portions 59 of the film drawn in between the film toward the lower portion of the article 45 come into contact with the substrate 17 and are sealed to the substrate similarly to portions 35 of the film in FIGS. 5-7. However, portions 59 are not drawn all the way to the base 51 of the article at the sides of the article (i.e., they are not drawn into what are, in effect, undercuts at the sides of the article). Portions 61 of the film beneath the fillets and extending down from the fillets to the substrate become sealed together to form webs or gussets similar to the webs or gussets 37 shown in FIGS. 5-7.

While it is preferred that the reinforcement, e.g., the netting 5 of FIG. 2 or the single set of strands or ribs 43 of FIG. 10 be combined with the film before the skin-packaging operation, either by being bonded to the film by the coating 13 or extruded integrally with the film, it is possible that the reinforcement (netting or single set of strands) be separate from the film up to the skin-packaging operation. This is illustrated in FIG. 13, where the film is indicated at 71 and the reinforcement at 73, the reinforcement being shown as netting. In this mode of operation, the netting would be withdrawn from a roll of netting, and an appropriate length cut off for assembly with a piece of film, or strands would be withdrawn from rolls and appropriate lengths cut off for assembly with a piece of film. In FIG. 13 the netting 73 is shown spaced from the film 71 as it may be before being clamped with the film in the wrapper clamping frame of the skin-packaging machine. When clamped, the netting is in contact with the bottom face of the film. The netting or strands, when separate from the film up to the skin-packaging operation, should be on the bottom of the film during the heating and vacuum-drawing so as to be drawn around the article and onto the upper face of the substrate by the film. While it is preferred that the reinforcement be on the bottom also when pre-combined film and reinforcement are used, it is possible that the skin-packaging operation could be carried out with the reinforcement on top.

The following examples illustrate the invention:

EXAMPLE I

Netting was extruded of a blend by weight of 60% ethylene vinyl acetate (EVA) and 40% polypropylene (PP). The strands of the netting were generally 0.035 inch thick, arranged generally as shown in FIG. 2, with about 1¼ inch spacing of the strands. This netting was laminated to an ethylene vinyl acetate film 7.5 mils thick, more particularly ethylene vinyl acetate film sold under the trade designation 3445 by E. I duPont de Nemours Co., by extruding a coating of coating grade polyethylene on the film and passing the film with the netting on the coated side of the film through a set of rolls to press the netting and film together. The polyethylene was applied in such amount as to be about 1 mil thick on the final wrapping material (amounting to about 20 pounds of polyethylene per ream). The film, netting and the laminant were all clear, i.e., generally transparent.

A piece of the composite EVA film and 60% EVA/40% PP netting was used as a wrapper to skin package a block of steel measuring 6"×8"×1". The block was placed with one of its 8"×1" sides down as the base on a substrate comprising an 18"×24" piece of 200 pound C-flute corrugated paperboard in an AMPAK Model 400 SVA skin packaging machine. The wrapper was clamped in the wrapper clamping frame of the machine, heated for 42 seconds, and the machine was operated to effect the skin packaging of the block on the paperboard. The resulting package was generally as illustrated in FIG. 5, with the illustrated tenting or webbing around the block at its base, and the block (although quite heavy and relatively tall and slender) was firmly confined on the substrate and not prone to tipping over.

Certain property values of the material as drawn around the article were determined, and, for comparison, the same block was skin-packaged on a substrate of the same paperboard in the same skin packaging machine, using conventional films, and the same property values determined with the results as shown in the following chart:

| | Property | Units | SKIN PACKAGING PERFORMANCE DATA[1] 15 mil 3445 EVA film | 7.5 mil 3445 EVA film | Reinforced 3445 EVA film[2] | % Difference[3] |
|---|---|---|---|---|---|---|
| 1. | Cycle Time | Sec | 56 | 42 | 42 | −25 |
| 2. | Yield | in²/lb | 2000 | 4000 | 3270 | +64 |
| 3. | Tensile Strength (to breaking) | lbs/in (M.D.)[5] | 19.3 | 13.0 | 18.3 | −5 |
| 4. | Ultimate Elongation (at breaking) | % (M.D.) | 460 | 470 | 480 | +4 |
| 5. | Elemendorf Tear[4] | gms/mil (M.D.)[5] (T.D.)[6] | 130 135 | 140 140 | 245 400 | +88 +196 |
| 6. | Drawn Gauge Profile | Mils | 5.6-11.7 | 3.5-6.0 | 5.2-10.6 | — |

[1]Property values were obtained by skin packaging of 6" tall, 8" wide, 1" thick metal block and then determining physical properties of the drawn films.
[2]7.5 mil 3445 EVA film reinforced with 60% EVA/40% PP netting.
[3]Comparison made between the reinforced 3445 EVA film and 15 mil 3445 EVA film, a film judged to be a conventional skin packaging film of comparable strength.
[4]Film tore but netting only elongated.
[5]M.D. refers to "machine direction" with respect to the netting, i.e., the direction of strands 7.
[6]T.D. refers to "transverse direction" with respect to the netting.

The 15 mil EVA film was selected for the test because as noted on the chart it was judged to be of comparable strength to the netting-reinforced 7.5 mil EVA film. The 7.5 mil EVA film was selected for the test for a comparison of unreinforced film and film of the same thickness reinforced in accordance with this invention. All films were duPont 3445 EVA film. Referring to the chart, it will be observed that while the netting-reinforced film of this invention took only 42 second to heat up to forming temperature as compared to 56 seconds (a 25% reduction in cycle time) and was only 5% lower in tensile strength than the plain 15 mil film, it had an effective yield 64% greater than the plain 15 mil film, a comparable elongation (4% better) and substantially better tear strength, (88% better) in machine direction of the netting, 196% better in transverse direction of the netting. Thus, the material of this invention comprising a 7.5 mil EVA film and a 60% EVA/40% PP reinforcing netting as discribed was basically as effective for skin packaging a high-profile heavy item as the 15 mil plain EVA film, while being much more economical to use (64% higher yield, 25% lower heating cycle time) than the plain film. At the same time, it had good strength and good resistance to tear propagation.

EXAMPLE II

Netting was extruded the same as in Example I and laminated in the same manner to 10 mil EVA film (du-Pont 3445 EVA film). The resultant composite material (film and netting) was used to skin-package the same article in the same manner as in Example 1 except that the heating time was 45 seconds (on account of the film thickness of 10 mils instead of 7.5 mils), which is the proper cycle time for 10 mil EVA film to heat up to the necessary forming temperature for skin packaging. This produced a strong, tight skin package with the tenting or webbing extending about 1" from the base of the block around the block.

In contrast, a composite material consisting of 15 mil EVA film and the same netting, heated for the cycle time for 15 mil EVA film per se (55 seconds) exhibited very little tenting or webbing. This is apparently due to the longer heating time resulting in excessive softening of the netting, rendering it as extensible as the film. Conversely, a composite material consisting of 5 mil EVA film and the same netting heated for the cycle time for 5 mil EVA film (35 seconds) exhibited excessive tenting or webbing, due to insufficient softening of the netting.

EXAMPLE III

Loose strands or filaments 45 mils thick of a blend by weight of 50% SURLYN (described above) and 50% EVA were spaced two inches apart and generally parallel to one another and clamped together with a 7.5 mil EVA film on the underside of the film in the wrapper clamping frame of the skin packaging machine, heated for the cycle time for 7.5 mil EVA film (40 seconds) and employed to skin package the same block as in Example I. This produced a skin package with tenting or webbing extending about 2 inches from the base of the block around the block. On heating the strands were less extensible than the film due to the difference in softening point and thicknesses, thus effecting the webbing.

In contrast to the above, wrapping material was formed by extruding EVA to form 7.5 mil film with integral (co-extruded) ribs 40 mils thick. This was heated for 40 seconds (the cycle time for 7.5 mil EVA film) but exhibited very little webbing (only 0.4" webbing) with little improvement in package support over film per se. The absence of webbing is attributed to the film and ribbing being of the same material and thereby having the same softening point, and to the 40/7.5 thickness ratio as between the ribbing and the film being insufficient to make the ribbing sufficiently less extensible on heating for 40 seconds than the film or producing a significant webbing effect.

EXAMPLE V

Example I was repeated using 5 mil film and the same netting as used in Example I colored with 0.25% by weight of a brown pigment. This reduced the heating time necessary to attain the proper degree of extensibility such as to produce 1" webbing about the base of the block.

In view of the above, it will be seen that the several objects of the invention are achieved and other advantageous results attained.

As various changes could be made in the above methods, constructions, and products without departing from the scope of the invention, it is indended that all matter contained in the above description or shown in the accompanying drawings shall be interpreted as illustrative and not in a limiting sense.

What is claimed is:

1. The method of skin packaging an article comprising placing the article on a substrate which is adapted to have air drawn therethrough, the article being placed on a face of the substrate which is adapted for heat-sealing thereto of a wrapper of thermoplastic material, heating a wrapper for skin-packaging the article on the substrate, said wrapper comprising a film of thermoplastic material adapted on exposure for an appropriate time interval to a source of heat to heat up to a forming temperature at which it is softened and inelastically extensible for being skin-packaged around an article on a substrate, and a reinforcement for the film comprising strands also of a thermoplastic material adapted on exposure together with the film to the source of heat for said time interval to heat up to a forming temperature at which the strands are softened and inelastically extensible for being skin-packaged together with the film around the article, the strands being so related to the film, as determined by their composition, thickness and color, that when heated simultaneously with the film for the said time interval they become extensible but less extensible than the film, the wrapper, comprising the film and strands, being heated by exposure to a source of heat for said time interval concurrently to heat both the film and the strands up to forming temperature but with the strands less extensible than the film, draping the heated wrapper over the article on the substrate, and drawing a vacuum through the substrate to draw the wrapper, comprising the film and strands, around the article and into contact with said face of the substrate and to effect heat sealing of the film to said face of the substrate, strands overlying the article resisting being drawn toward the base of the article and portions of these strands solidifying into members flaring outwardly and downwardly from points on the article between the base and the top of the article to points on the substrate spaced outwardly from the base of the article.

2. The method of claim 1 wherein the strands are on one face of the film and the wrapper is draped over the article with said face toward the article and the substrate.

3. The method of claim 2 wherein the strands are bonded to said face of the film by a coating of thermoplastic material on said face of the film, and the wrapper is bonded to the substrate by heat sealing of said coating to the substrate in the areas bounded by the strands.

4. A package comprising a substrate of a material adapted to have air drawn therethrough and adapted for thermal bonding to one face thereof of thermoplastic material, an article on said face of the substrate, and a wrapper overlying the article and bonded to said face of the substrate, said wrapper comprising a film of thermoplastic material and a reinforcement for the film, said reinforcement comprising a plurality of strands of thermoplastic material, said strands being so related to the film, as determined by their composition, thickness and color, that when heated simultaneously with the film they become extensible along with the film but less extensible than the film, said film and said reinforcement being drawn over the article and providing a reinforced skin at least substantially covering the article and holding it on the substrate, strands overlying the article having, by reason of their lower extensibility than the film on being heated simultaneously with the film, portions flaring outwardly and downwardly from points on the article between the base and the top of the article to points on the substrate spaced outwardly from the base of the article.

5. A package as set forth in claim 4 wherein the reinforcing strands are on the inside of the film and in engagement with said face of the substrate, the film engaging and being bonded to said face of the substrate in areas bounded by the strands.

6. A package as set forth in claim 5 wherein the strands are bonded to said face of the substrate.

7. A package as set forth in claim 4 wherein the strands are in the form of netting, the strands in the netting intersecting one another and being joined at the intersections.

8. A package as set forth in claim 7 wherein the netting is on the inside of the film and in engagement with said face of the substrate, the film engaging and being bonded to said face of the substrate in the interstices of the netting.

9. A package as set forth in claim 8 wherein the film has a coating on the inside face thereof of a thermoplastic material, the netting being boned to said coating, the film being heat-sealed to said face of the substrate by said coating in the interstices of the netting.

10. A package as set forth in claim 5 wherein the film is drawn in between said flaring portions of the strands and has portions between the strands in contact with and sealed to the substrate and portions beneath said flaring portions extending to the substrate and sealed together face-to-face.

* * * * *